United States Patent [19]

Lerner et al.

[11] Patent Number: 4,769,266
[45] Date of Patent: Sep. 6, 1988

[54] COVERSHEET MATERIAL

[75] Inventors: Peter Lerner, N. Attleboro; Hamzeh Karami, Weston, both of Mass.

[73] Assignee: Fiber Technology Corporation, Walpole, Mass.

[21] Appl. No.: 802

[22] Filed: Jan. 6, 1987

[51] Int. Cl.$^4$ ............................................... B32B 1/04
[52] U.S. Cl. ..................................... 428/68; 428/280; 428/284; 428/282; 428/287; 428/296; 428/703
[58] Field of Search ............... 428/280, 284, 287, 296, 428/288, 282, 68, 703

[56] References Cited

U.S. PATENT DOCUMENTS 4,039,711 8/1977 Neuman .............................. 428/287

Primary Examiner—James J. Bell
Attorney, Agent, or Firm—Francis J. Clark

[57] ABSTRACT

An improved coversheet material for use in multi-layer boards. The improvement comprises a layer of continuous filament and a layer of fibrous web. The fibrous web is a blend of thermoplastic fibers. The thermoplastic fibers are high melt point fibers and low melt point fibers. The layer of continuous filament and the layer of fibrous web are bonded together by passing the layers between a pair of heated rolls which are under pressure. As the heat from the rolls melts the low melt point fibers, the pressure exerted on the rolls puts the melted fibers into contact with the high melt point fibers and the layer of continuous filament. As the melted fibers cool they secure themselves, the high point fibers and the continuous filament layer together to form an integral structure. The continuous filament provide strength to the coversheet material while the high melt point fibers in the fibrous web provide compatability with core materials used in a multi-layered board. This compatability permits the high melt point fibers to bond to the core material.

8 Claims, 1 Drawing Sheet

COVERSHEET MATERIAL

BACKGROUND OF THE INVENTION

FIELD OF INVENTION

This invention relates to composite materials for use as coversheets for multi-layer load-bearing boards, including but not limited to wallboard and ceiling tiles. This invention relates more specifically to a coversheet for a wallboard.

PRIOR ART

Multi-layer boards comprised of laminated layers are known. U.S. Pat. No. 2,806,811, for example describes a paper-covered gypsum board wherein the paper layers are bonded to the gypsum with a resin adhesive.

Laminated boards that use good quality materials for cover layer or layers are very useful. However, considerable difficulties have been encountered in providing a strong and lasting bond between layers of different materials since not only the adhesive but also the mechanical properties of the materials cause problems. Gluing or bonding with adhesive does not provide strong enough connections between layers.

Attempts to bond layers to each other while their materials were still wet and the layers were, therefore, in a plastic condition failed. These bonds failed because when an organic plastic material is cast on a fresh core layer of a water-containing cementitious binder material, which is not heat hardened, a water layer forms between the layers. As the core layer hardens the water layer prevents formation of a bond between the layers.

In U.S. Pat. No. 4,292,364 there is described a multi-layer board which uses a coversheet comprised of a fiber-reinforced resin. In order to bond the coversheet to the core material an intermediate layer is needed between the core and the cover. The intermediate layer is a blend of resin and fiber. The intermediate layer is poured in a liquid state over the core material. The cover layer is then placed over the intermediate layer. The composition is then subjected to a temperature of 80° C. to cure the resin. After curing of the resin, the layers are mechanically locked together. There is a disadvantage with this prior art method because of the numerous process steps necessary to complete the composite and to cure the resin.

The present invention does not use a resin to secure a coversheet to an inner core material of a multi-layered board. The fibers in the coversheet of the present invention adhere to the core material that is used in wall board construction. The fibers in the present invention adhere to the core materials because the fibers are compatible with the cementious inner core materials used in making wall board.

It is the primary object of the present invention to provide a coversheet that has a strong adhesion to the core material of a multi-layered board so that there is no separating of the coversheet from the core material when the multi-layer board is in use.

Another object of the present invention is to provide a coversheet material that has high tensile strength in both the machine direction and cross direction so as to support plaster of Paris or other cementitious materials during the manufacturing of multi-layer board.

Still another object of the present invention is to provide a coversheet that has a high abrasion resistance surface so as to permit long term cleaning and washing of this surface.

Another object of the present invention is to provide a coversheet that has a textile surface so as to facilitate printing on its surface.

A further object of the present invention is to provide a coversheet that has high tensile strength in both the machine and cross direction so as to provide structural strength to a finished product, such as wallboard.

An additional object of the present invention is to provide a coversheet that has a surface that may be thermally embossed prior to the application of plaster of paris or other construction materials.

Still another object of the present invention is to provide a coversheet with substantial porosity to permit evaporation of moisture out through it during the process of making a multi-layer board.

Other objects of the present invention will be understood in the remaining specification.

BRIEF SUMMARY OF THE INVENTION

An improved coversheet for use on multi-layer boards. The improvement comprising a layer of continuous filament of thermoplastic polyester and a layer of a polyester fibrous web bonded together. The fibrous web is a blend of thermoplastic high melt point polyester fibers and low melt point polyester fibers. The layer of continuous filament and the layer of fibrous web are bonded together by passing the layers between a pair of heated rolls which are under pressure. As the heat from the rolls melts the low melt point fibers, pressure exerted on the rolls puts the melted fibers into contact with the high melt point fibers and the layer of continuous filament. As the melted fibers cool they secure themselves to the high melt point fibers and the continuous filament, thus forming an integral structure. The continuous filament provide strength to the coversheet material while the high melt point fibers provide compatability with core materials used in a multi-layered board. This compatability permits the high point fibers to bond to the core material.

BRIEF DESCRIPTION OF THE DRAWINGS

The objects and advantages of the present invention will become more apparent when viewed in conjunction with the following drawings, in which.

DESCRIPTION OF THE PREFERRED EMBODIMENT

Figure 1:
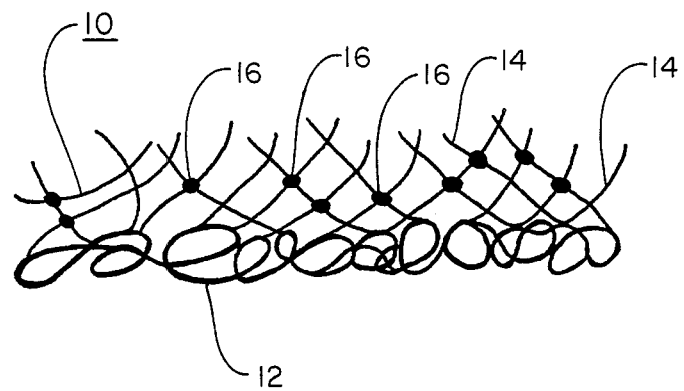
FIG. 1 illustrates a layer of fibrous web and a layer of continuous filament in the present invention.
Figure 2:
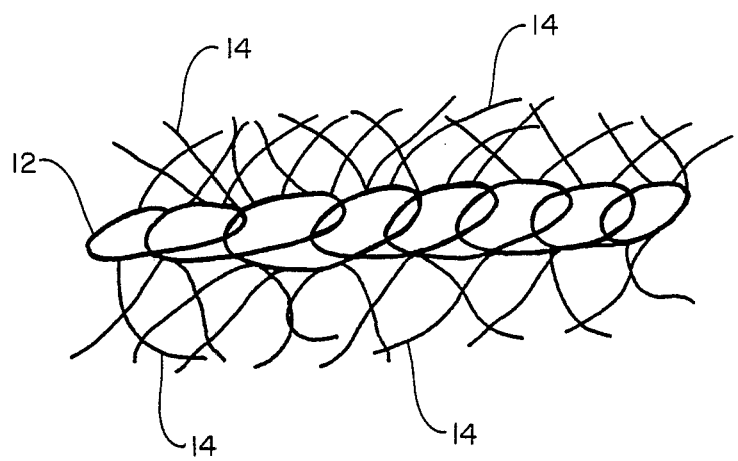
FIG. 2 illustrates the present invention with a fibrous web on each side of the continuous filament.

Referring to FIG. 1, the present invention is shown to be an integral substrate 10 having a layer of a continuous filament 12 and a blended layer of fibers in a fibrous web 14 bonded together at discrete points 16. The continuous filament 12 comprises at least 25% of the coversheet material. The continuous filament 12 is an extrusion of a thermoplastic polyester which is interlocked or mixed and fused together into a stable and integral substrate. Continuous filament of this nature are commonly known as spunbond fabric. Spunbond fabric is made by several companies. The spunbond used in the present invention is made under the tradename "Lutradur" by the Lutravil Company, of Durham, N.C. The fibrous web 14 is a blended carded web having between 70–80% of textile fibers with a high melt point and between 20–30% of textile fibers with a low melt point. The preferred percentages of high melt point fibers and low melt point fibers in the blend are 75% and 25% respectively. The low melt point fiber is the fiber used to bond the continuous filament 12 and the fibrous web 14 together as illustrated by the bond points 16, in FIG. 1. The high melt point and low melt point fibers are thermoplastic polyester. The preferred high melt point fiber is Style 411 and the preferred low melt point fibers are either Style 410 or 438. The aforementioned fibers are made by the Eastman Company of Kingsport, Tenn. Although the present invention as shown in FIG. 1 is a layer of continuous filament and a layer of blended fibers, the layer of blended fibers may be put on both sides of the continuous filament as shown in FIG. 2.

When manufacturing a product such as a wallboard, the continuous filament in the present invention is utilized to adhere the total composite of the present invention to cementitious materials used in the manufacturing process.

The adhesion process between the continuous filament of the present invention and the cementitiuous materials, for example plaster of Paris, is based on the electromechanical forces developed by the affinity of the surface molecules of the polyester continuous filament 12, and the polyester fibers in the fibrous web 14 to the cementitious material. "Affinity" is defined for the purpose of this specification as when one element of a material has a positively induced polarity and a second element has a negatively induced polarity, thus creating an attraction to each other. The polyester filament and the polyester fibers have the basic generic formula R-OOC-C$_6$-H$_4$-COO-R where R is an alcohol derived radical of the methyl or ethyl alcohol and the carboxylic portion is derived from terephtalic acid. The terminal oxygen of the carboxylic radical in the polyester continuous filament and polyester fiber formula imparts a negative charge to the molecules of the filament and fibers. The plaster of Paris has the generic formulation CaSO$_4$.2H$_2$O in slurry form and then in the dehydrated, dry and crystaline form CaSO$_4$.½H$_2$O. The calcium in the plaster of Paris imparts a positive charge to the plaster of Paris. Thus, the negative charged polyester filament and polyester fibers are attracted to the positive charged plaster of Paris by electromechanical affinity. In the wet form the Ca++ terminal portion of the molecules in the plaster of Paris will produce a electromechanical bond to the carboxylic portion of the polyester filament and fibers. When the plaster of Paris dries the bond between the fibers and the plaster of Paris sets resulting in a strong bond between them. This bond is important because it provides excellent structual strength to wallboard that uses plaster of Paris therein. Structual strength is required in construction materials, such as wallboard because of the handling of the materials when the material is being erected. Without structual strength the materials would break because of their weight. In addition, the bond between the plaster of Paris and polyester filament and polyester fibers eliminates any tendency of the coversheet to delaminate from the core material of the wallboard. The affinity between the plaster of Paris and polyester filament and fibers creates a bond of 1.3 to 2.0 pounds per inch of width of material.

The present invention is produced by combining a blend of high melt point fibers and low melt point fibers with a continuous filament layer. The high melt point polyester textile fibers have a melt point of between 410°–480° F. with the preferred melt point being 480° F. The low melt point polyester binder fibers have a melt point between 190° F. and 270° F. with the preferred melt point being 190° F. Although the continuous filament has a preferred melt point of 480° F., the melt point may range between about 430° F. to about 520° F. The combination is then processed together. The combined material is processed through either a single nip between two heated and pressured rolls of a calender or by passing them through a nip point while the composite is partially wrapped around two or more heated rolls in order to expose both sides of the fabric to the heat and pressure of the calender rolls. The preferred process is to pass the composite through a single nip. The calender rolls may be made from steel, hard polymer or covered steel rolls. The surfaces of these rolls may be smooth or patterned depending on the required surface of a finished product. For best results the calender rolls may preferably be heated to about 390° F., but the temperature may range between about 350° F. to about 410° F. The processing temperature is a higher temperature than the polyester binder fibers but a lower temperature than the continuous filament and the high melt point polyester fibers. The speed of the calender may range between about 30 to about 120 feet per minute (fpm), with the preferred speed being about 40 fpm. To insure sufficient pressure is exerted on the fabric being calendered, about 60 to 1000 pounds per inch gage (psig) should be applied to the rolls. This pressure will produce about 5 to 16 pounds per linear inch of calender roll width, which is needed to insure the melted fibers contact the spunbond fabric and the other polyester fibers. The preferred pressure is about 15 pounds per linear inch of width. As the low melt point fibers melt they become fluid and flow to the crossover points of the high melt point fibers and the continuous filament of the spunbond fabric where they form beads. As the beads form they tend to encapsulate portions of the heat resistant polyester fibers. As the beads cool and solidify, the strong bond points 16, are formed, as shown in FIG. 1, at the fiber crossover points. Bonding takes place at the point of contact of the spunbond and fibrous web producing an integral fabric. This interface of fiber has a relatively high strength of 1–2 lbs. per inch. The strength is also a result of the use of medium to high pressures of calender rolls that have either smooth surfaces, or raised high point-binding areas on the surface of the rolls.

An example is given to further demonstrate the present invention. The following example is not intended to limit the scope of the use of the present invention. Other uses may also be made of the present invention for example, ceiling tiles.

EXAMPLE 1

A polyester spunbond fabric purchased from Lutravil of North Carolina was utilized as a substrate with low melt point polyester binder fibers and high melt point polyester base fibers to form a composite. The composite was comprised of 25% of the spunbond fabric with a melt point of 480° F., and a fibrous web having a blend of 25% low melt point fibers, having a melt point of 190° F. and 75% of the high melt point fibers, with a melt point of 480° F. The spunbond substrate and the polyester fibers were secured together by passing the resulting composite through a pair of calender rolls. The calendar rolls were heated to a temperature of 390° F. The heated rolls were also subjected to a pressure of 80 psig. As the low melt point fibers contacted the heated rolls, the fibers started to melt. As the fibers melt they flowed into the high melt fibers and the spunbond fabric. As the resulting fabric cooled the spunbond and the polyester fibers became secured together.

A test was conducted on a prior art wallboard coversheet of polyvinyl chloride (PVC) (sample "A") and a sample of the present invention coversheet (sample "B"). Sample "A" is used by National Gypsum of Buffalo, N.Y. in the making of wallboard. In comparing the weight of the samples used in the test it should be noted that sample "B" was about 20% of the weight of the prior art sample "A". This is a distinct advantage over the prior art because any wallboard made with the present invention will be of a lighter weight. The present invention coversheet also makes sample "B" more economical than the prior art because it is made from low cost fibers, not PVC. As shown in the test reults, the tensile strength in the machine direction (MD) of sample "B" exceeds the tensile strength of sample "A". It should also be noted that the cross direction (CD) strength in sample "B" is 200% higher than the CD in sample "A". Thus, the present invention has superior CD and MD tensile strength when compared to the prior art. Because the tensile strengths of the samples after being wet are the most important it should be noted that the wet-tensile strengths of sample "B" remained high when compared to it's dry tensile strengths. On the other hand the wet-tensile strengths of sample "A" remained low when it became wet. Sample "B" has an advantage over the prior art because it is far superior in wet strength. Wet strength is important because in the process of making wallboard the coversheet has to be strong enough to carry the plaster of Paris without failing. In addition, the Mullen burst of sample "B" is about 300% higher than sample "A". The Frazier and Gurley porosities are far superior for sample "B" than they are for sample "A". The high porosity of sample "B" permits the plaster of Paris, used in wallboard, to dry faster because the moisture in the plaster of Paris will evaporate out through sample "B" at a faster rate. Sample "B" had good abrasion resistance.

Another advantage the present invention has is that it provides a textile surface on one side of the product. This is due to the fact of the fibers being exposed on that side. This is not prevalent in prior art.

Additionally, because of the use of thermoplastic fibers in the present invention, the coversheet may be thermally embossed with various patterns.

| | TEST RESULTS | |
|---|---|---|
| | National Gypsum Sample "A" Coversheet PVC film | Kendall Sample "B" Coversheet polyester filament/fibers |
| Wt. (g/sq.yd) | 282 | 105 |
| Thickness (mils) | 19.3 | 6.6 |
| Tensiles (lb/in) | | |
| MD-Dry | 22 | 80 |
| CD-Dry | 16 | 30 |
| MD-Wet | 22 | 78 |
| Elongation (%) | | |
| MD-Dry | 106 | 30-40 |
| CD-Dry | 63 | 35-40 |
| MD-Wet | 69 | 30-40 |
| CD-Wet | 51 | 35-40 |
| Mullen Burst (psi) | | |
| Dry | 59 | 150 |

| | TEST RESULTS | |
|---|---|---|
| | National Gypsum Sample "A" Coversheet PVC film | Kendall Sample "B" Coversheet polyester filament/fibers |
| Frazier Permeability (ft$^3$/ft$^2$/min) | 0.43 | 3 |
| Gurley Porosity (sec/100 of air cc) | 108 | 12 |
| Abrasion (5-best 0-worst 4-pass) | 5 | 4 |

According to the test results the properties of sample "B" were superior to sample "A". Furthermore, as shown in the test results the present invention (sample "B") has provided a coversheet with the following: strong adhesion to an inner core material of a multi-layered board so as to prevent the coversheet from separating from the inner core; high tensile strength in both the machine direction and cross direction. This strength is needed so as to provide 70 to 88% of the structural strength in finished wallboard to support the plaster of Paris; high abrasion resistance surface so as to permit long term cleaning and washing of the coversheet; a textile surface so as to facilitate printing on the surface; and a surface that may be thermally embossed prior to the application of plaster of Paris or other construction materials.

The coversheet fabric as shown in the test results is porous and a vapour transmitter. These properties permit quick setting and drying of the plaster of Paris or other wet slurries utilized in the manufacturing of wallboard. The above properties will not let moisture accumulate in between the layers because of the breathability of the present invention coversheet. In addition, when the wallboard is in use as a wall member, moisture will not accumulate within the wall because of the breathability of the coversheet material. This is a distinct advantage over sample "A" of the prior art. Tensile strength of the present invention ranges between 60 to 80 lbs/in machine direction and 20-30 lbs/in. in the cross direction. The present invention is also resistant to moisture, commonly used solvents and mild acid and alkalis, because of the inherent resistance of the polyester fibers and filament.

What is claimed:

1. An improved coversheet material bonded to for cementitious material used in multi-layered wallboard construction, wherein improvement comprises:
    an exposed layer of continuous filament material having an affinity to cementitious material; and
    an exposed layer of fibrous web having a blend of high melt point fibers and low melt point fibers;
    said layer of continuous filament material and said fibrous web layer being bonded together by heat and pressure;
    said coversheet material remaining porous permitting vapor transmission through it while permitting quick setting and drying of said cementitious materials used in said multi-layer wallboard construction.

2. The coversheet of claim 1 wherein said continuous filament is polyester.

3. The coversheet of claim 1 wherein said fibrous web has a blend of between 70–80% high melt point polyester fiber and 20–30% low melt point polyester fibers.

4. The coversheet of claim 1 wherein said continuous filament is at least 25% of said material.

5. The coversheet of claim 2, wherein said polyester is heated to a range of about 430° F. to about 520° F.

6. The coversheet of claim 3, wherein said high melt point polyester is heated to a range of about 410° F. to about 480° F.

7. The coversheet of claim 3, wherein said low melt point polyester is heated to a range of about 190° F. to about 220° F.

8. The coversheet of claim 3, wherein said high melt point polyester and said low melt point polyester are compressed to a range of about between 5 to about 16 pounds per linear inch.

* * * * *